US006955699B2

(12) United States Patent
Bergami

(10) Patent No.: US 6,955,699 B2
(45) Date of Patent: Oct. 18, 2005

(54) DEVICE FOR FILTERING THE INTAKE AIR OF INTERNAL COMBUSTION ENGINES

(75) Inventor: Gaetano Bergami, Bologna (IT)

(73) Assignee: BMC S.r.l., Medicina (IT)

( * ) Notice: Subject to any disclaimer, the term of this patent is extended or adjusted under 35 U.S.C. 154(b) by 0 days.

(21) Appl. No.: 10/182,223

(22) PCT Filed: Jan. 10, 2001

(86) PCT No.: PCT/IB01/00013

§ 371 (c)(1),
(2), (4) Date: Jul. 24, 2002

(87) PCT Pub. No.: WO01/55581

PCT Pub. Date: Aug. 2, 2001

(65) Prior Publication Data

US 2003/0029144 A1 Feb. 13, 2003

(30) Foreign Application Priority Data

Jan. 25, 2000 (IT) .................................... BO2000A0024

(51) Int. Cl.[7] ................................................ B01D 29/50

(52) U.S. Cl. .......................... 55/385.3; 55/482; 55/489; 55/498; 55/505; 55/510; 55/521

(58) Field of Search ................................ 55/385.3, 482, 55/489, 498, 505, 510, 521

(56) References Cited

U.S. PATENT DOCUMENTS

| | | | | | |
|---|---|---|---|---|---|
| 3,144,315 | A | | 8/1964 | Hunn | |
| 4,292,061 | A | | 9/1981 | Land | |
| 5,549,724 | A | * | 8/1996 | Mochida | 55/521 |
| 5,685,887 | A | | 11/1997 | Mochida | |
| 5,688,299 | A | | 11/1997 | Goodwin | |

* cited by examiner

*Primary Examiner*—Robert A. Hopkins
(74) *Attorney, Agent, or Firm*—William J. Sapone; Coleman Sudol Sapone PC

(57) ABSTRACT

A device for filtering the intake air of an internal combustion engine having an expansion box (110) with an opening (12) for the intake air to pass therethrough, has a filter fixed to the opening that includes a first tubular filtering element having an upper annular element (1) having an upper end of the first tubular filtering element fixed thereto. A second filtering element is peripherally fixed to the upper annular element, over an upper end of the first tubular filtering element. A lower support (4) has an annular housing (9) for receiving the lower end of the first tubular filtering element therein, and a flat flange (7) for fixing the filter to the expansion box.

24 Claims, 4 Drawing Sheets

FIG.4
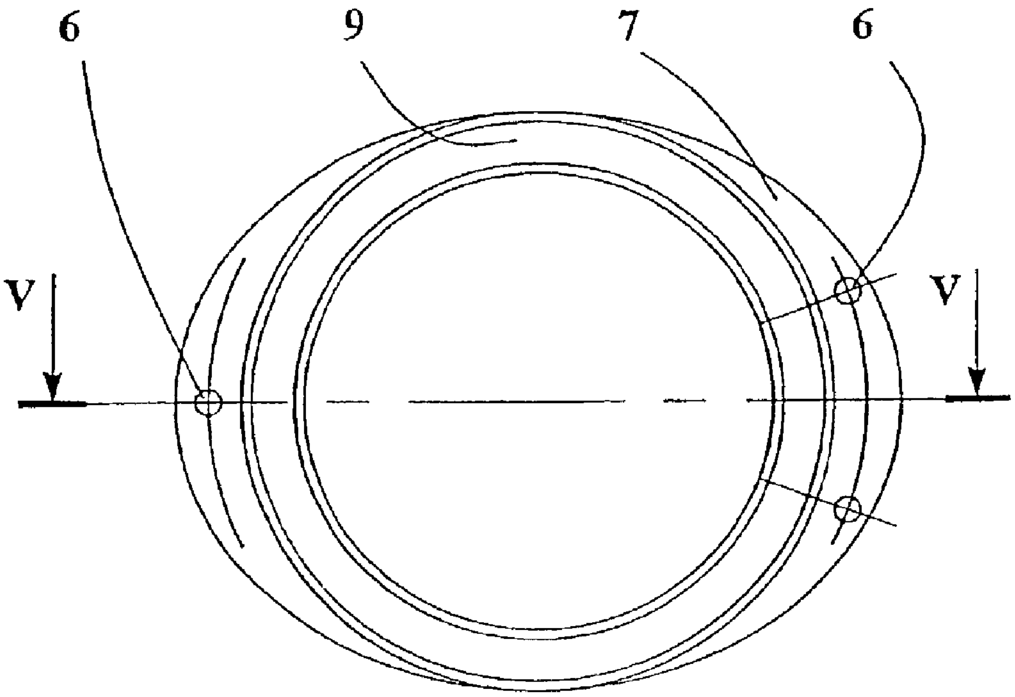
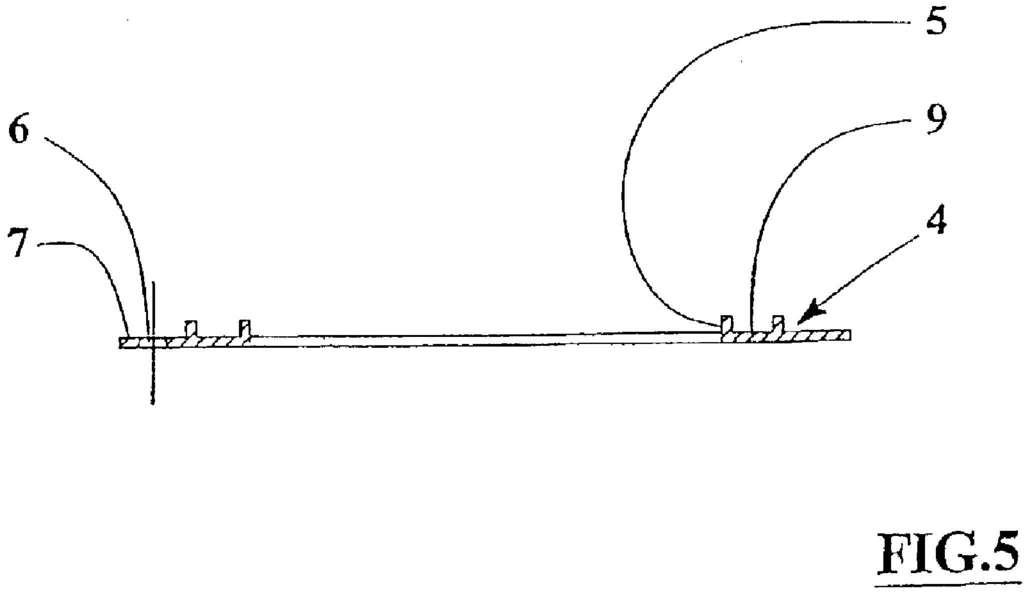
FIG.5

FIG.6
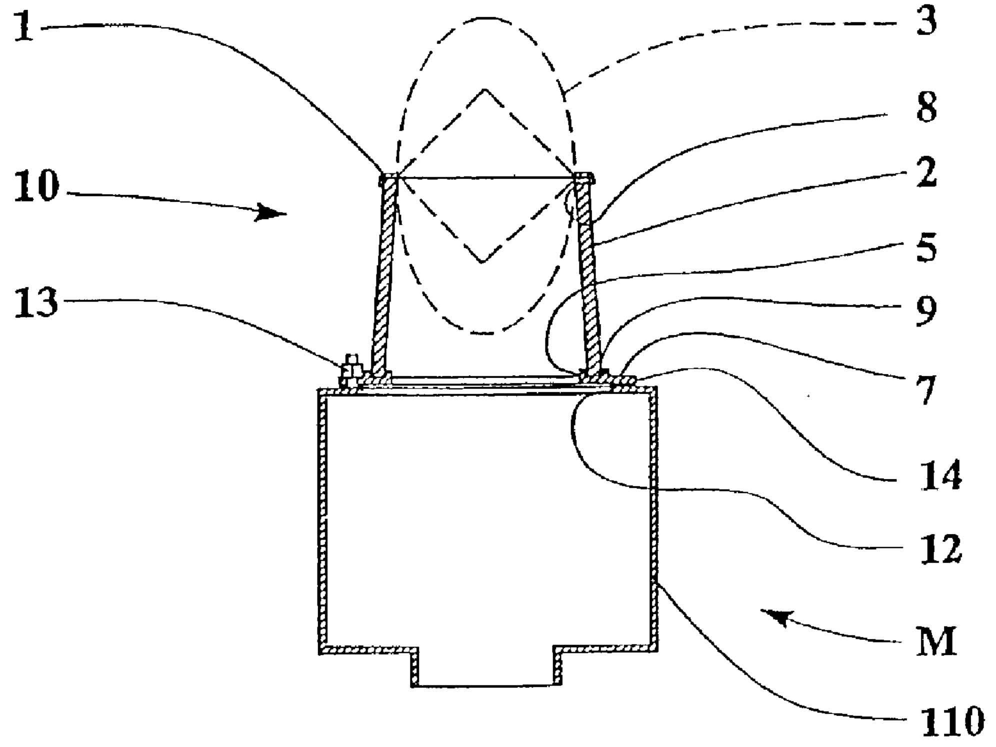
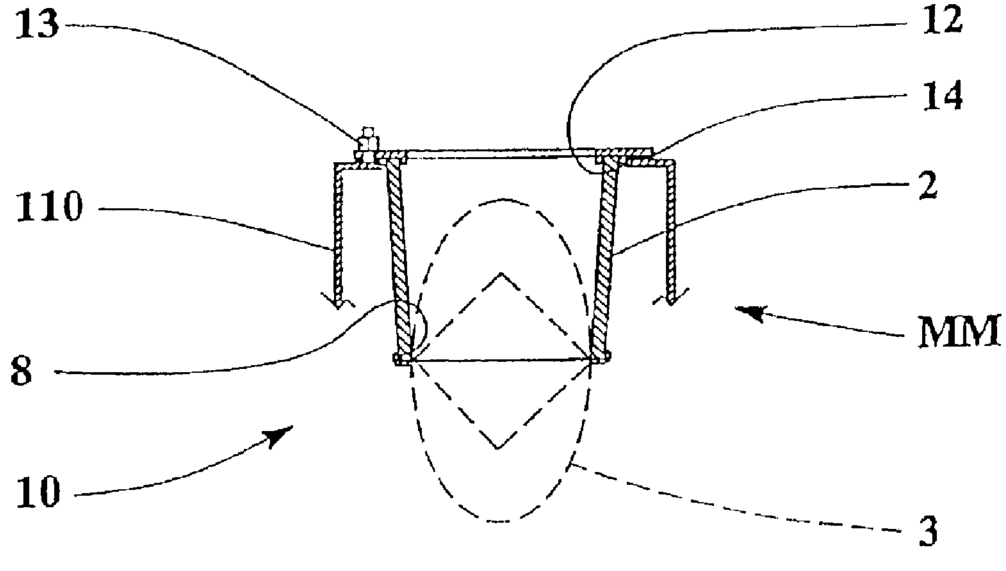
FIG.7

DEVICE FOR FILTERING THE INTAKE AIR OF INTERNAL COMBUSTION ENGINES

TECHNICAL FIELD

The present invention relates to filters for filtering the intake air of internal combustion engines. Essentially the invention refers to filters for the intake air of supercharged and aspirated internal combustion engines, particularly of the type used in the races.

Document U.S. Pat. No. 5,685,887 discloses a filter element comprising a filter material having corrugated sectional surface formed in the shape of a cylindrical housing. An upper portion of the cylindrical housing is kept closed, and a lower opening portion is connected to an air suction duct. The upper and lower portions of the cylindrical housing are respectively fixed to a support ring edge member and a ring shaped connecting member of synthetic rubber. The main drawback of said filter element consists in that the ring edge and connecting members are heavy, expensive and not resistant to temperature higher than the vulcanization temperature of the synthetic rubber.

A further drawback consists in that said connecting member of the filter element can be fixed only externally to an apposite connector of the suction duct.

Document U.S. Pat. No. 5,688,299 discloses an air filter including a base member oval or circular flange shaped, internally provided with fixing screw for the connection to an adequate and specific support. The main drawback of said latter filter consists in that it can be assembled only externally to said specific support.

A further drawback of the known filters consist in that the filtering elements have form and dimensions preset by the characteristics of the relative container or connector and therefore not adjustable.

The known filters for the use in sporting engines, the usually called "sprint filter", have polyester filtering elements, whose ends have heavy polyurethane flanges and/or caps that are extremely expensive and further cannot withstand temperatures greater than 90° C., because of the used material. These filters are generally truncated cone shaped and they are enclosed in metallic containers shaped as almost conic or truncated-conic portions.

The known filters with the paper filtering elements guarantee a good filtration, because they hold particles bigger than 10 $\mu$m, but they have the drawback of an excessive flow resistance for the airflow passing through.

Another drawback of the latter known filters consists in the insufficient filtering surface, due to the conic shape of the filter having wide inclination angles.

DISCLOSURE OF THE INVENTION

The main object of the present invention is to propose a filter for the intake air of internal combustion engines that does not require a special case or container but that is assembled on the expansion box of the intake collector.

A further of the present invention is to propose a visible and checkable filter from the outside and with an easy and fast assembling and disassembling outside and inside of the expansion box.

A further object is to propose a filter with adjustable geometric features without modifying the fixing or housing means.

A further object is to propose a light filter but at the same time solid, stiff and resistant to temperatures higher than 200° C.

Other object is to propose a filter with a large surface of the filtering elements and low flow resistances of the filtered air.

Further object is to propose a filtering device reliable having a life for a route not less than 150,000 km, however usable with a very low maintenance and easy to dispose because principally made of a natural material.

BRIEF DESCRIPTION OF THE DRAWINGS

The characteristics of the invention are underlined in the following with particular reference to the attached drawings, in which:

FIG. 4 shows a plant view of supporting means of the filter of FIG. 2;

FIG. 5 shows a section view according to the plain V—V of the supporting means of the FIG. 4;

FIG. 6 shows a section view of two variant of the filter of FIG. 1 in correspondence of the assembling condition;

FIG. 7 shows a section view of the filter of FIG. 6 in correspondence of a variant of the assembling condition.

BEST MODE OF CARRYING OUT THE INVENTION

Figure 1:
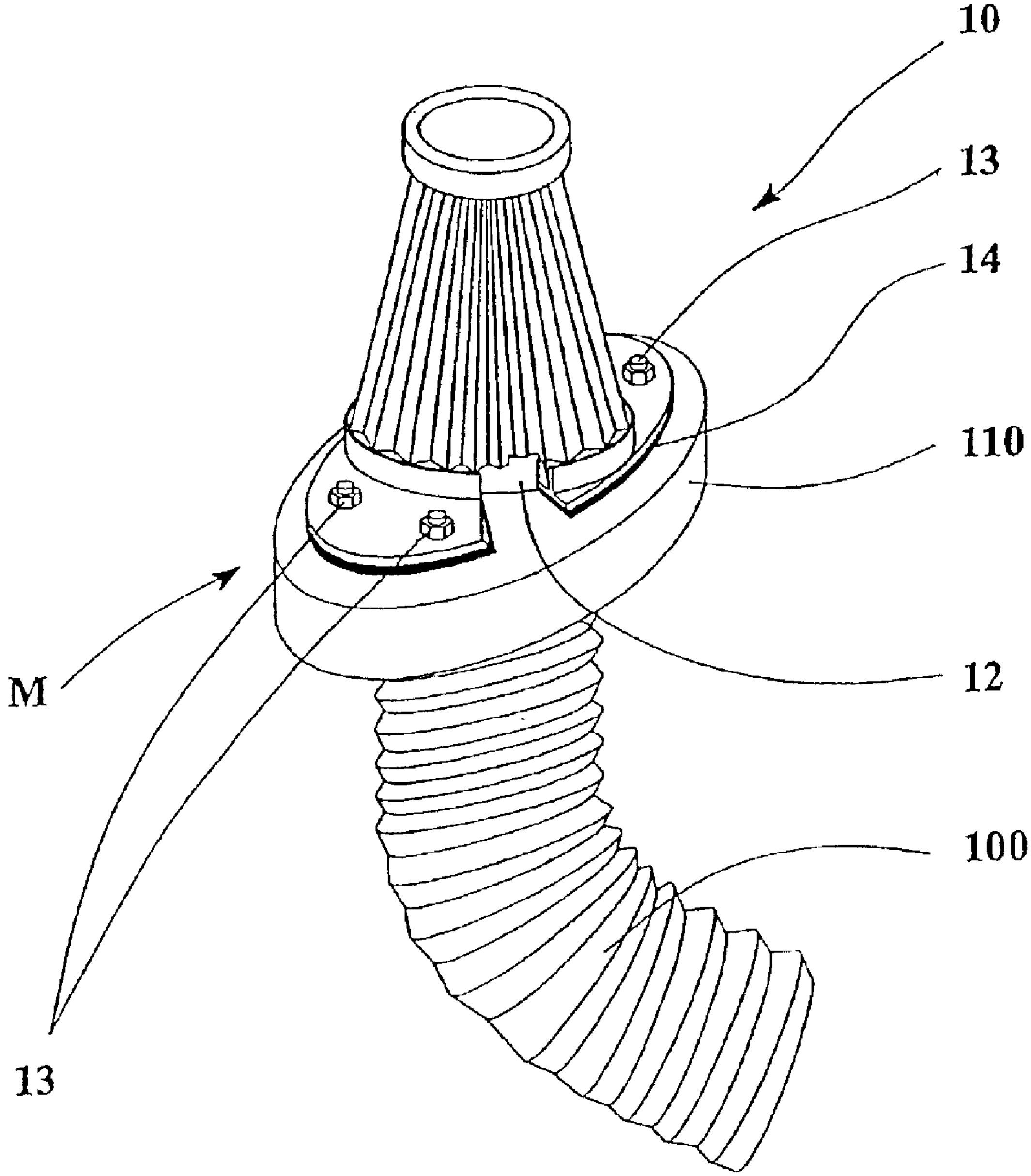
FIG. 1 shows a perspective view of the filter in an assembled condition in the engine.
Figure 2:
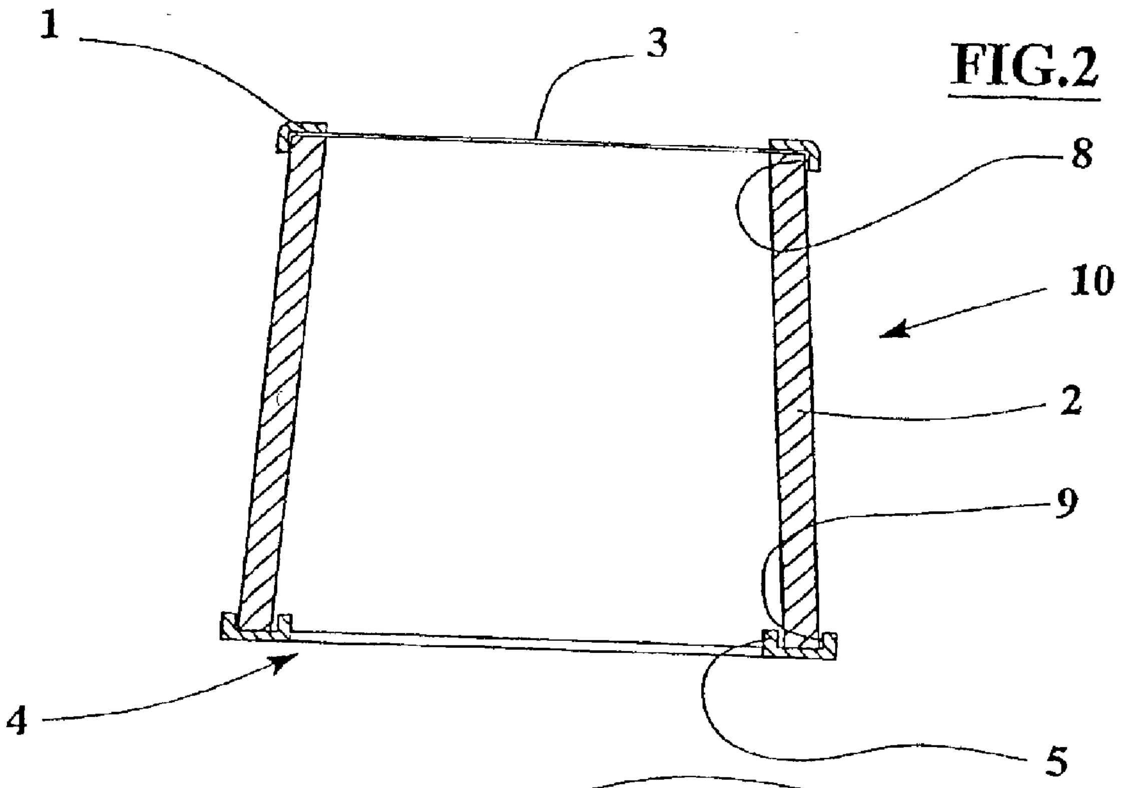
FIG. 2 shows an enlarged longitudinal section view of the filter of FIG. 1.
Figure 3:
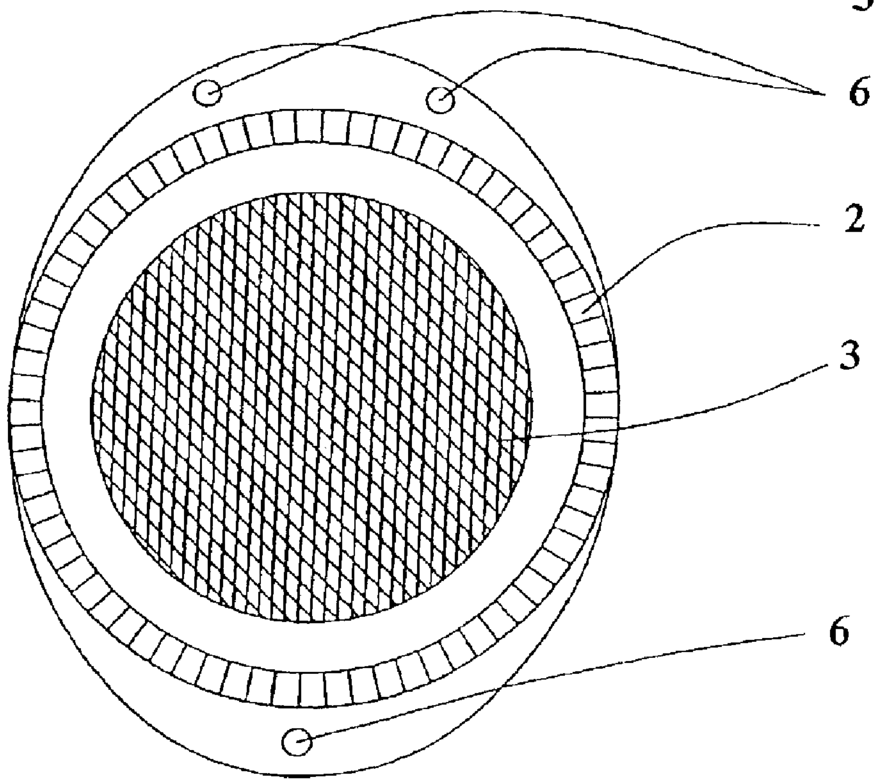
FIG. 3 shows a top view of the filter of FIG. 2.

With reference to the figures from 1 to 7, numeral 10 indicates a filter for the intake air of internal combustion engines, numeral 100 indicates an intake collector of the air and numeral 110 indicates an expansion box of the internal combustion engine.

The filter 10 includes a first filtering tubular element 2, a second filtering element 3, an upper annular element 1 and supporting means 4.

The fist filtering elements 2 are tubular shaped, for instance cylindrical or truncated-conical shaped with round or oval or elliptical cross sections, delimited by an upper and a lower end.

The second filtering elements 3 are substantially flat with a circular or oval or elliptical shape.

The first filtering elements 2 have angular or undulated beads in order to stiffen the structure and to increase the surface development.

Both the filtering elements, first 2 and second 3, are made by interposing between two layers of metallic net, for instance made of aluminum, a plurality, for instance four, of layers of fabric or felt in natural cotton soaked with low viscosity oil, before assembling the filter 10.

The upper element 1 consists in a circular or elliptical or oval flange having a "L" shaped section whose inside angle carry out an upper annular housing 8 to which the upper ends of the first filtering elements 2 and the external edge of the second filtering elements 3 are fixed.

The supporting means 4 include a lower annular housing 9, circular or oval or elliptical shaped, to which the lower end of the first filtering elements 2 is fixed.

Furthermore, the supporting means 4 have a central circular hole 5 and an elliptical shaped flat flange 7 with a plurality, for instance three, of external holes 6 for assembling the filter 10.

It is also provided that the upper element 1 and the supporting means 4 are made in composite material with synthetic matrix strengthened with carbon fibers.

Furthermore the fixing of the first filtering elements 2 to the annular housings, upper 8 and lower 9, and the fixing of the second filtering means 3 to the upper annular housing 8 is made by gluing with bi-component synthetic resins, for instance epoxidic or polyurethanic.

The collector 100 substantially consists in a duct, for instance a wrinkled flexible or rigid hose, whose ends are connected and in flow communication with the supply elements of the internal combustion engine and with the expansion box 110. The expansion box 110 substantially consists in a rigid case, for instance cylindrical shaped with elliptical section or parallelepipedal shaped, having in a flat portion fixing means 13 consisting, for instance, in stud bolts corresponding to the external holes 6 of the flange 7 and nuts or wing nuts. The expansion box 110 has an opening 12 that, in assembling condition M, mates the hole 5 of the flange 7.

It is further provided a gasket 14 positioned between the flange 7 and the expansion box 110 in order to guarantee the pneumatic seal. Obviously the gasket 14, for instance made of synthetic rubber, has no interference with the fixing means and with the opening 12 of air passage of the expansion box 110. The sealing gasket 14 has also the purpose to share the forces and to uniform the joining pressure between the expansion box 110 and the filter 10 and to reduce the vibrations transmitted to this latter.

The operation provides that the engine intake air flows initially through the filtering elements first and second 2,3 which purifies the air from particles and dusts, having dimensions bigger than the filtering capacity of the fabric or oil soaked cotton felt, and in sequence, flows through the expansion box 110 and the collector 100 finally arriving to the supply elements of the internal combustion engine where the air and fuel are mixed. inside to the expansion box 110 of suitable geometric features. Besides, the filter object of the present invention is suitable for fast changes and disposition variations that are valuable features in the races and the prototypes fields.

There are variants, not shown, in which the flange 7 is approximately circular or polygonal shaped in order to realize the better coupling with the expansion box 110 whit respect to the characteristics of this latter.

Further variants, partially shown in FIGS. 6 and 7, refers to the shape of the second filtering element 2 that has alternatively concave or convex shape, with approximately semi-elliptical section, developed toward the inside or the outside of the filter 10, or with beads having concentric annular parallel development, or with approximately conical shape, developed toward the outside or the inside of the filter 10, having a series of radial beads starting from the cone vertex up to the base in proximity of the upper element 1. The beads have for instance triangular or undulated sections.

The above-described variants do not modify the operation but increase the filtering useful surface of the filter 10 and/or strengthen this latter.

The main advantage of the present invention is to provide filters that do not need a particular container but can be mounted on an expansion box of the intake collector.

A further advantage consists in that the filters according to the present invention are visible and checkable from the outside and have an easy and quick assembling and disassembling, and have variable and modifiable geometric features without modifying the fixing or housing means.

Another advantage is to provide single body filters lightweight but at the same time solid, stiff and resistant to temperatures even higher than 200° C., and filters having a large surface of the filtering elements and low flow resistance of the filtered air.

A further advantage consists in providing a reliable filter having a life for a route not less than 150,000 km, however usable with a very low maintenance and easy to dispose because primarily made of a natural material.

What is claimed is:

1. A device for filtering intake air for an internal combustion engine comprising:

an expansion box (110) having an opening (12) for receiving the intake air;

a filter (10) located adjacent to the opening for filtering the intake air passing through the opening, the filter having a first tubular filtering element (2), an upper annular element (1) having an annular "L" section flange fixed to an upper end thereof and having an upper annular housing (8) for receiving an end of the first tubular filter element therein, a lower annular housing (9) fixed to a lower end thereof, the lower annular housing having means for supporting the first tubular filtering element therein, and having a flat flange (7) for fixing the filter to the expansion box, a second filtering element (3) peripherally fixed to the upper annular element (1), over an upper end of the first tubular filtering element, the means for supporting the first tubular filtering element being made of a composite material containing a synthetic matrix having carbon fibers therein.

2. The device of claim 1 wherein the flat flange (7) has a shape selected from the group consisting of elliptical, circular and polygonal.

3. The device of claim 1 wherein the flat flange has holes for receiving fixing means for mounting to the expansion box.

4. The device of claim 1 wherein the second filtering element is flat and has a circular shape.

5. The device of claim 1 wherein the second filtering element has a shape selected from the group consisting of concave and convex with a semi-elliptical section.

6. The device of claim 1 wherein the second filtering element further comprises a series of beads disposed about the element.

7. The device of claim 6 wherein the beads are annular, concentric beads.

8. The device according to claim 1 wherein the second filtering element has a substantially conical shape and contains a series of beads therein.

9. A device according to claim 1, wherein the first tubular filtering element and the second filtering element each contain a plurality of cotton layers, soaked with low viscosity oil.

10. The device according to claim 1 further comprising a gasket (14) interposed between the expansion box (110) and the flat flange (7).

11. The device according to claim 1 wherein the first tubular filtering element, the second filtering element, the upper annular housing (8) and the lower annular housing (9) are glued together to form the filter (10).

12. The device according to claim 1 wherein the filter (10) is fixed externally on the expansion box (110).

13. A device for filtering intake air for an internal combustion engine comprising:

an expansion box (110) having an opening (12) for receiving the intake air;

a filter (10) located adjacent to the opening for filtering the intake air passing through the opening, the filter having a first tubular filtering element (2), an upper annular element (1) having an annular "L" section flange fixed to an upper end thereof and having an upper annular housing (8) for receiving an end of the first tubular filter element therein, a lower annular housing (9) fixed to a lower end thereof, the lower annular housing having means for supporting the first tubular filtering element therein, and having a flat flange (7) for fixing the filter to the expansion box, a second filtering element (3) peripherally fixed to the upper element, over an upper end of the first tubular filtering element, the filter (10) being substantially contained within the expansion box (110).

14. The device of claim 13 wherein the flat flange (7) has a shape selected from the group consisting of elliptical, circular and polygonal.

15. The device of claim 13 wherein the flat flange has holes for receiving fixing means for mounting to the expansion box.

16. The device of claim 13 wherein the second filtering element is flat and has a circular shape.

17. The device of claim 13 wherein the second filtering element has a shape selected from the group consisting of concave and convex with a semi-elliptical section.

18. The device of claim 13 wherein the second filtering element further comprises a series of beads disposed about the element.

19. The device of claim 18 wherein the beads are annular, concentric beads.

20. The device according to claim 13 wherein the second filtering element has a substantially conical shape and contains a series of beads therein.

21. A device according to claim 13, wherein the first tubular filtering element and the second filtering element each contain a plurality of cotton layers, soaked with low viscosity oil.

22. The device according to claim 13 further comprising a gasket (14) interposed between the expansion box (110) and the flat flange (7).

23. The device according to claim 13 wherein the first tubular filtering element, the second filtering element, the upper annular housing (8) and the lower annular housing (9) are glued together to form the filter (10).

24. The device according to claim 13 wherein the filter (10) is fixed externally on the expansion box (110).

* * * * *